US012784072B2

(12) United States Patent
Biffert et al.

(10) Patent No.: US 12,784,072 B2
(45) Date of Patent: Nov. 3, 2026

(54) LIVESTOCK CARBON CREDIT MONITORING SYSTEM

(71) Applicant: 701x Inc., Fargo, ND (US)

(72) Inventors: Kevin N. Biffert, Horace, ND (US); Maximillion K. Cossette, Fargo, ND (US); Steven J. Berlinger, Dilworth, MN (US); Peter S. Crowley, Fargo, ND (US); Cole L. Mehring, Fargo, ND (US); Keith D. Alsleben, Fargo, ND (US); Braydon W. Love, Fergus Falls, MN (US); Chad A. Heath, Fargo, ND (US)

(73) Assignee: 701x Inc., Fargo, ND (US)

( * ) Notice: Subject to any disclaimer, the term of this patent is extended or adjusted under 35 U.S.C. 154(b) by 152 days.

(21) Appl. No.: 18/303,730

(22) Filed: Apr. 20, 2023

(65) Prior Publication Data

US 2024/0354797 A1 Oct. 24, 2024

(51) Int. Cl.
*G06Q 30/0207* (2023.01)
*A01K 11/00* (2006.01)
(Continued)

(52) U.S. Cl.
CPC ........ *G06Q 30/0223* (2013.01); *A01K 11/008* (2013.01); *A01K 29/005* (2013.01);
(Continued)

(58) Field of Classification Search
CPC .. A01K 29/005; A01K 11/008; G06Q 10/087; G06Q 30/0223; G06Q 30/08;
(Continued)

(56) References Cited

U.S. PATENT DOCUMENTS 4,461,241 A 7/1984 Ostler
4,503,808 A 3/1985 McAlister
(Continued)

FOREIGN PATENT DOCUMENTS

AU 2017239570 A1 4/2018
CN 101221231 A 7/2008
(Continued)

OTHER PUBLICATIONS

González-Sánchez C, Prediction of Cow Calving in Extensive Livestock Using a New Neck-Mounted Sensorized Wearable Device: A Pilot Study. Sensors (Basel). Dec. 2, 2021;21(23):8060. (Year: 2021).*

(Continued)

*Primary Examiner* — Florian M Zeender
*Assistant Examiner* — Milena Racic
(74) *Attorney, Agent, or Firm* — Neustel Law Offices

(57) ABSTRACT

Livestock carbon credit monitoring systems and methods are disclosed herein. An example system includes a livestock monitoring device, comprising a location tracking unit and an inertial measurement unit (IMU), configured to be attached to livestock that graze in the paddock. A service provider is configured to enable a user to create a geofence around the paddock, based on parcel boundaries. The service provider automatically generates inventory numbers of the livestock using output from the livestock monitoring device, including location data and timestamps indicative of when the livestock entered and left the paddock. The system estimates vegetation consumption in the paddock by the livestock, based on the inventory numbers and the output of the livestock monitoring device.

19 Claims, 4 Drawing Sheets

(51) Int. Cl.

| | |
|---|---|
| ***A01K 29/00*** | (2006.01) |
| ***G06Q 10/087*** | (2023.01) |
| ***G06Q 30/08*** | (2012.01) |
| ***G06V 20/10*** | (2022.01) |
| ***G06V 20/13*** | (2022.01) |
| ***H04W 4/02*** | (2018.01) |
| ***H04W 4/021*** | (2018.01) |
| ***H04W 4/029*** | (2018.01) |

(52) U.S. Cl.
CPC ........... *G06Q 10/087* (2013.01); *G06Q 30/08* (2013.01); *G06V 20/13* (2022.01); *G06V 20/188* (2022.01); *H04W 4/021* (2013.01); *H04W 4/025* (2013.01); *H04W 4/029* (2018.02)

(58) Field of Classification Search
CPC ........ G06Q 50/02; G06V 20/13; G06V 40/20; H04W 4/021; H04W 4/025; H04W 4/029; A61B 5/0836; A61B 5/097; A61B 2503/40; G06T 2207/30188; H04N 7/18
See application file for complete search history.

(56) References Cited

U.S. PATENT DOCUMENTS

| | | | | |
|---|---|---|---|---|
| 4,512,096 | A | 4/1985 | Heidecker | |
| 5,711,246 | A | 1/1998 | Yano | |
| 5,791,294 | A | 8/1998 | Manning | |
| 5,794,569 | A | 8/1998 | Titus | |
| 5,857,433 | A | 1/1999 | Files | |
| 6,067,018 | A | 5/2000 | Skelton | |
| 6,111,508 | A | 8/2000 | Ensor | |
| 6,243,039 | B1 | 6/2001 | Elliot | |
| 6,375,612 | B1 | 4/2002 | Guichon | |
| 6,507,771 | B2 | 1/2003 | Payton | |
| 6,510,380 | B1 | 1/2003 | Curatolo | |
| 6,512,478 | B1 | 1/2003 | Chien | |
| 6,674,368 | B2 | 1/2004 | Hawkins | |
| 6,720,879 | B2 | 4/2004 | Edwards | |
| 6,788,199 | B2 | 9/2004 | Crabtree | |
| 6,805,078 | B2 | 10/2004 | Zimmerman | |
| 6,868,804 | B1 | 3/2005 | Huisma | |
| 6,997,140 | B2 | 2/2006 | Finlayson | |
| 6,998,980 | B2 | 2/2006 | Ingley, III | |
| 6,998,985 | B2 | 2/2006 | Reisman | |
| 7,059,275 | B2 | 6/2006 | Laitinen | |
| 7,164,986 | B2 | 1/2007 | Humphries | |
| 7,218,229 | B2 | 5/2007 | Boyd | |
| 7,234,421 | B2 | 6/2007 | Natividade | |
| 7,248,167 | B2 | 7/2007 | Wassingbo | |
| 7,335,168 | B2 | 2/2008 | Rugg | |
| 7,411,492 | B2 | 8/2008 | Greenberg | |
| 7,467,603 | B2 | 12/2008 | Davies | |
| 7,525,425 | B2 | 4/2009 | Diem | |
| 7,616,124 | B2 | 11/2009 | Paessel | |
| 7,728,724 | B1 | 6/2010 | Scalisi | |
| 7,830,257 | B2 | 11/2010 | Hassell | |
| 7,904,244 | B2 | 3/2011 | Sugla | |
| 7,918,185 | B2 | 4/2011 | Araki | |
| 8,018,329 | B2 | 9/2011 | Morgan | |
| 8,125,332 | B2 | 2/2012 | Curran | |
| 8,149,125 | B2 | 4/2012 | Geissler | |
| 8,285,245 | B2 | 10/2012 | Ashley, Jr. | |
| 8,312,845 | B2 | 11/2012 | Guinta | |
| 8,340,022 | B2 | 12/2012 | Lee | |
| 8,849,926 | B2 | 9/2014 | Marzencki | |
| 8,890,677 | B2 | 11/2014 | Raphaeli | |
| 8,979,757 | B2 | 3/2015 | Mottram | |
| 8,983,426 | B2 | 3/2015 | Cermak | |
| 9,038,293 | B2 | 5/2015 | Decaluwe | |
| 9,044,297 | B2 | 6/2015 | Rajkondawar | |
| 9,370,170 | B2 | 6/2016 | Downing | |
| 9,448,072 | B2 | 9/2016 | Bandyopadhyay | |
| 9,449,202 | B2 | 9/2016 | Clare | |
| 9,489,813 | B1 | 11/2016 | Beigel | |
| 9,504,387 | B2 | 11/2016 | Lanza | |
| 9,848,577 | B1 | 12/2017 | Brandao | |
| 9,936,676 | B1 | 4/2018 | Ulmer | |
| 9,980,467 | B2 | 5/2018 | Auer | |
| 10,075,813 | B1 | 9/2018 | Struhsaker | |
| 10,242,547 | B1 * | 3/2019 | Struhsaker | H04W 4/021 |
| 10,292,370 | B2 | 5/2019 | Mobley | |
| 10,660,546 | B2 | 5/2020 | Saigh | |
| 10,697,947 | B1 | 6/2020 | Armitage | |
| 11,232,393 | B1 * | 1/2022 | Kim | H04W 4/029 |
| 11,503,802 | B2 | 11/2022 | Jones | |
| 11,832,584 | B2 * | 12/2023 | Wooten | A01K 15/023 |
| 12,029,197 | B1 * | 7/2024 | Biffert | A01K 29/005 |
| 12,161,085 | B2 * | 12/2024 | Bassett | A01K 1/105 |
| 2002/0046713 | A1 | 4/2002 | Otto | |
| 2002/0050248 | A1 | 5/2002 | Pratt | |
| 2004/0074448 | A1 | 4/2004 | Bunt | |
| 2004/0078390 | A1 | 4/2004 | Saunders | |
| 2005/0006153 | A1 | 1/2005 | Baarsch | |
| 2005/0162279 | A1 | 7/2005 | Marshall | |
| 2006/0097882 | A1 | 5/2006 | Brinkerhoff | |
| 2006/0161443 | A1 | 7/2006 | Rollins | |
| 2006/0201432 | A1 | 9/2006 | Pratt | |
| 2006/0267731 | A1 | 11/2006 | Chen | |
| 2007/0012260 | A1 | 1/2007 | Boyd | |
| 2007/0171048 | A1 | 7/2007 | Shapiro | |
| 2007/0209594 | A1 | 9/2007 | Kaever | |
| 2007/0229350 | A1 | 10/2007 | Scalisi | |
| 2008/0147458 | A1 | 6/2008 | Yamazaki | |
| 2010/0030036 | A1 | 2/2010 | Mottram | |
| 2010/0127853 | A1 | 5/2010 | Hanson | |
| 2010/0156606 | A1 | 6/2010 | Gold | |
| 2011/0102154 | A1 | 5/2011 | Hindhede | |
| 2011/0125062 | A1 | 5/2011 | Mulder | |
| 2011/0125065 | A1 | 5/2011 | Voronin | |
| 2011/0137812 | A1 | 6/2011 | Sherga | |
| 2011/0148639 | A1 | 6/2011 | Geissler | |
| 2011/0192356 | A1 | 8/2011 | Loosveld | |
| 2012/0050046 | A1 | 3/2012 | Satorius | |
| 2012/0065483 | A1 | 3/2012 | Chung | |
| 2012/0294876 | A1 * | 11/2012 | Zimmerman | A61B 5/082<br>128/203.14 |
| 2013/0175347 | A1 | 7/2013 | Decaluwe | |
| 2013/0340305 | A1 | 12/2013 | Mobley | |
| 2014/0237595 | A1 | 8/2014 | Sridhara | |
| 2015/0039239 | A1 | 2/2015 | Shuler | |
| 2015/0097668 | A1 | 4/2015 | Toth | |
| 2015/0282457 | A1 | 10/2015 | Yarden | |
| 2015/0373951 | A1 | 12/2015 | Kelly | |
| 2016/0143719 | A1 | 5/2016 | Folkers | |
| 2017/0156288 | A1 | 6/2017 | Singh | |
| 2017/0196203 | A1 * | 7/2017 | Huisma | G08C 17/02 |
| 2018/0048987 | A1 | 2/2018 | Morris | |
| 2018/0054399 | A1 | 2/2018 | Shinoda | |
| 2018/0146645 | A1 | 5/2018 | Arbel | |
| 2018/0160649 | A1 | 6/2018 | Hicks | |
| 2018/0279582 | A1 | 10/2018 | Yajima | |
| 2018/0295809 | A1 | 10/2018 | Yajima | |
| 2018/0374165 | A1 | 12/2018 | Ferro dos Santos | |
| 2019/0008117 | A1 | 1/2019 | Dijkstra | |
| 2019/0008124 | A1 | 1/2019 | Komatsu | |
| 2019/0141959 | A1 | 5/2019 | Ingham | |
| 2019/0220844 | A1 | 7/2019 | Trivelpiece | |
| 2019/0223408 | A1 | 7/2019 | Brayer | |
| 2019/0254601 | A1 | 8/2019 | Blackmore | |
| 2019/0380311 | A1 | 12/2019 | Crouthamel | |
| 2020/0022338 | A1 | 1/2020 | Rovnyi | |
| 2020/0029534 | A1 | 1/2020 | Austin | |
| 2020/0085005 | A1 | 3/2020 | Yoo | |
| 2020/0107522 | A1 | 4/2020 | Kersey | |
| 2020/0125849 | A1 | 4/2020 | Labrecque | |
| 2020/0159720 | A1 | 5/2020 | Leong | |
| 2020/0160009 | A1 | 5/2020 | Vatn | |
| 2020/0323170 | A1 | 10/2020 | Garigan | |
| 2020/0359605 | A1 | 11/2020 | Maher | |
| 2020/0367471 | A1 | 11/2020 | Deliou | |
| 2021/0148881 | A1 | 5/2021 | Deng | |

(56) References Cited

U.S. PATENT DOCUMENTS

| | | | | |
|---|---|---|---|---|
| 2022/0104929 | A1 | 4/2022 | Cummins | |
| 2022/0192150 | A1 | 6/2022 | Biffert | |
| 2022/0192151 | A1 | 6/2022 | Biffert | |
| 2022/0192152 | A1 | 6/2022 | Biffert | |
| 2022/0200519 | A1 | 6/2022 | Biffert | |
| 2022/0270112 | A1* | 8/2022 | Sahara | G06Q 30/018 |
| 2022/0374912 | A1* | 11/2022 | Zeng | G06Q 10/04 |
| 2025/0176497 | A1* | 6/2025 | Clark | A01K 27/009 |

FOREIGN PATENT DOCUMENTS

| | | | | |
|---|---|---|---|---|
| EP | 3153095 | A1 | 4/2017 | |
| EP | 3188648 | B1 | 1/2020 | |
| FR | 2801491 | A1 | 6/2001 | |
| GB | 2387465 | A | 10/2003 | |
| WO | 2000011939 | A2 | 3/2000 | |
| WO | 2005034617 | A1 | 4/2005 | |
| WO | 2019245978 | A1 | 12/2019 | |
| WO | 2020031050 | A1 | 2/2020 | |
| WO | 2020120516 | A1 | 6/2020 | |
| WO | 2021255731 | A1 | 12/2021 | |
| WO | 2022005288 | A1 | 1/2022 | |
| WO | WO-2022145792 | A1 * | 7/2022 | |
| WO | WO-2023159272 | A1 * | 8/2023 | A01K 29/005 |
| WO | WO-2024055066 | A1 * | 3/2024 | G10K 15/02 |

OTHER PUBLICATIONS

Andriamasinoro Lalaina, Development of an open-source algorithm based on inertial measurement units (IMU) of a smartphone to detect cattle grass intake and ruminating behaviors, Computers and Electronics in Agriculture, vol. 139, 2017, pp. 126-137 (Year: 2017).*

Samantha Mosier, Adaptive multi-paddock grazing enhances soil carbon and nitrogen stocks and stabilization through mineral association in southeastern U.S. grazing lands, Journal of Environmental Management, vol. 288, 2021 (Year: 2021).*

Non-Final Office Action Document Received for U.S. Appl. No. 18/302,351; Received Oct. 22, 2024.

https://www.gammon.com.au/power; "Power Saving Techniques for Microprocessors" Gammon Forum Webpage; Jan. 13, 2012.

PCT International Search Report and Written Opinion for PCT/US2023/086378; Apr. 11, 2024.

PCT International Search Report and Written Opinion for PCT/US2023/086390; Apr. 19, 2024.

Notice of Allowance Document Received for U.S. Appl. No. 18/162,885; Received May 8, 2024.

PCT International Search Report and Written Opinion for PCT/US2024/017441; Jun. 3, 2024.

https://brill.com/view/journals/clla/7/1/article-p1_1.XML; "Towards a Regulatory Design for Reducing Emissions from Agriculture:Lessons from Australia's Carbon Farming Initiative"; Verschuuren; Climate Law, 7(1), Jan. 9, 2017.

https://www.mla.com.au/contentassets/d2c78e9c83ee469fa6af08d6d3a2334b/p.psh.0834_final_report.pdf; "Integrating Spatial Technologies in a Mixed Farming System to Increase Production Efficiency of Crop Grazing"; Pearce; MLA, Jun. 22, 2018.

EPO Search Report and Opinion for Publication No. EP4266876; Oct. 8, 2024.

PCT Search Report and Opinion for PCT/US2024/029580; Sep. 17, 2024.

Atmel 8-Bit AVR Microcontroller with 2/4/8K Byes In-System Programmable Flash Datasheet; 2013. (Year: 2013).

Non-Final Office Action Document Received for U.S. Appl. No. 17/557,559; Received Dec. 22, 2023.

Non-Final Office Action Document Received for U.S. Appl. No. 18/330,659; Received Oct. 10, 2024.

http://www.sensehubbeef.com/; Allflex Livestock Intelligence "SenseHub Beef" Webpage; Received Sep. 3, 2020.

http://www.sensehubbeef.com/documents/pdf/SenseHubBeef.pdf; Allflex Livestock Intelligence "SenseHub Beef" Cow Monitoring Brochure; Copyright 2018.

https://www.cerestag.com/; Ceres Tag Website; Received Sep. 3, 2020.

https://web.archive.org/web/20200806065228/https://www.cerestag.com/benefits/; Internet Archive Wayback Machine Archive.org "Ceres Tag Benefits" Webpage; Aug. 6, 2020.

https://www.moovement.com.au/gps-ear-tags; mOOvement "GPS Ear Tag" Website; Received Sep. 3, 2020.

https://ieeexplore.ieee.org/document/1280774; IEEE Xplore Webpage Article "Wearable Sensor System for Wireless State-of-Health Determination in Cattle"; L. Nagl; Sep. 17, 2003.

https://www.mdpi.com/1424-8220/9/5/3586/htm; MDPI Webpage Article "Monitoring Animal Behaviour and Environmental Interactions Using Wireless Sensor Networks, GPS Collars and Satellite Remote Sensing"; Rebecca N. Handcock; Published May 13, 2009.

https://www.mdpi.com/1424-8220/9/5/3942/pdf; MDPI.com Webpage Article "A Heterogeneous Wireless Identification Network for the Localization of Animals based on Stochastic Movements"; Alvaro Gutierrez; May 25, 2009.

http://www.diva-portal.org/smash/get/diva2:21508/FULLTEXT01.pdf; Diva Article "Sensor Systems for Positioning and Identification in Ubiquitous Computing"; Suri Jayabharath Kumar; Feb. 13, 2006.

https:/www.beefcentral.com/ag-tech/gps-enabled-livestock-monitoring-tags-reach-the-commercial-market/; GPS-enabled livestock monitoring tags reach the commercial market; Beef Central; Mar. 17, 2020.

https://journalajarr.com/index.php/AJARR/article/view/13035/23855; "Design and Implementation of a Cattle Grazing Tracking and Anti-theft Alert GPS/GSM Collar, Leveraging on Improvement in Telecom and ICT Infrastructure", Asian Journal of Advanced Research and Reports, May 25, 2018.

PCT International Search Report and Opinion for PCT/US2021/064611; Apr. 27, 2022.

https://shop.realmfive.com/products/behlen-guardian; "Guardian by Behlen Country powered by RealmFive" Product Webpage; RealmFive and Behlen Country; Mar. 10, 2023.

https://www.ars.usda.gov/ARSUserFiles/30320505/grasshopper/Extras/PDFs/IPM%20Handbook/V7.pdf; "Beneficial Changes of Rangeland Through Proper Grazing" Article from USDA Website; Llewellyn L. Manske; Received Mar. 30, 2023.

* cited by examiner

LIVESTOCK CARBON CREDIT MONITORING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

The described example embodiments in general relate to a carbon credit generation system for ranchers, which calculates the amount of carbon sequestered through livestock grazing activities. The system utilizes geofences, livestock monitoring devices, and data processing to track grazing patterns, vegetation consumption, and optionally satellite imagery. The collected information can be used to determine the carbon credits generated, which ranchers can sell on a marketplace platform or exchange, enabling corporations or individuals to offset their carbon emissions.

SUMMARY

According to some embodiments, the present disclosure is directed to a system comprising a livestock monitoring device, which includes a location tracking unit output and an inertial measurement unit (IMU), configured to be attached to livestock that graze in the paddock. The system also includes a service provider configured to enable users to create a geofence around a paddock, based on parcel boundaries of owned or leased land. The service provider is further configured to automatically generate inventory numbers of the livestock using output from the livestock monitoring device associated with livestock in the paddock, based on location data and timestamps of when each of the livestock entered and left the paddock, and to combine the inventory numbers with additional livestock data as a predictor metric of vegetation consumption.

In some embodiments, the service provider is configured to utilize location data and IMU data from the livestock monitoring device to indicate grazed areas and estimate where vegetation has decreased. By analyzing this data, the service provider can provide valuable insights into the grazing patterns of the livestock within a specific area.

In further embodiments, the service provider is configured to generate a heat map of grazing activities based on historical locations and movement data. This heat map can visually represent the intensity of grazing activities in various areas, providing a better understanding of how the livestock utilize the available resources within the paddock.

Moreover, in some embodiments, the service provider includes a satellite imagery module configured to use satellite imagery to indicate vegetation indexes and grazed areas.

By incorporating satellite imagery, the system can provide a more accurate and comprehensive view of the vegetation conditions within the paddock.

Additionally, the satellite imagery module can be further configured to monitor vegetation and forage amounts over a grazing season. This allows the service provider to track changes in vegetation over time and to identify trends that may impact the overall productivity of the paddock.

In certain embodiments, the service provider is configured to determine a length of the grazing season, a type of vegetation in the paddock, and an amount of carbon sequestered. By analyzing this information, the system can provide valuable insights into the environmental impact of the livestock's grazing activities.

Furthermore, the service provider can be configured to calculate carbon credits based on the amount of carbon sequestered by livestock. These carbon credits can be used by ranchers as a means to offset their carbon footprint and to participate in carbon credit trading programs.

In some embodiments, the service provider includes a carbon credit marketplace module configured to enable ranchers to place the calculated carbon credits on a carbon credit exchange. This marketplace allows ranchers to sell their carbon credits to interested buyers, potentially providing an additional source of revenue.

In certain embodiments, the carbon credit marketplace module is configured to enable buyers to place bids and purchase carbon credits through the carbon credit exchange at a listed market price or bid. This provides a streamlined process for buyers to acquire carbon credits and for ranchers to sell their credits.

In some embodiments, the livestock monitoring device comprises a location sensor with an IMU. The combination of these sensors allows for accurate tracking of the livestock's location and movement, providing valuable data for analyzing grazing patterns and determining carbon sequestration estimates.

According to some embodiments, the present disclosure is directed to a method, comprising: creating a geofence around a paddock, based on parcel boundaries; receiving output from a livestock monitoring device attached to each livestock that graze in the paddock, the livestock monitoring device comprising a location tracking unit and an inertial measurement unit (IMU); automatically generating inventory numbers of the livestock using output from the livestock monitoring device, the output of the livestock monitoring device comprising location data and timestamps that are indicative of when the livestock entered and left the paddock; and estimating vegetation consumption in the paddock by the livestock from the inventory numbers and the output of the livestock monitoring device.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

Figure 1:
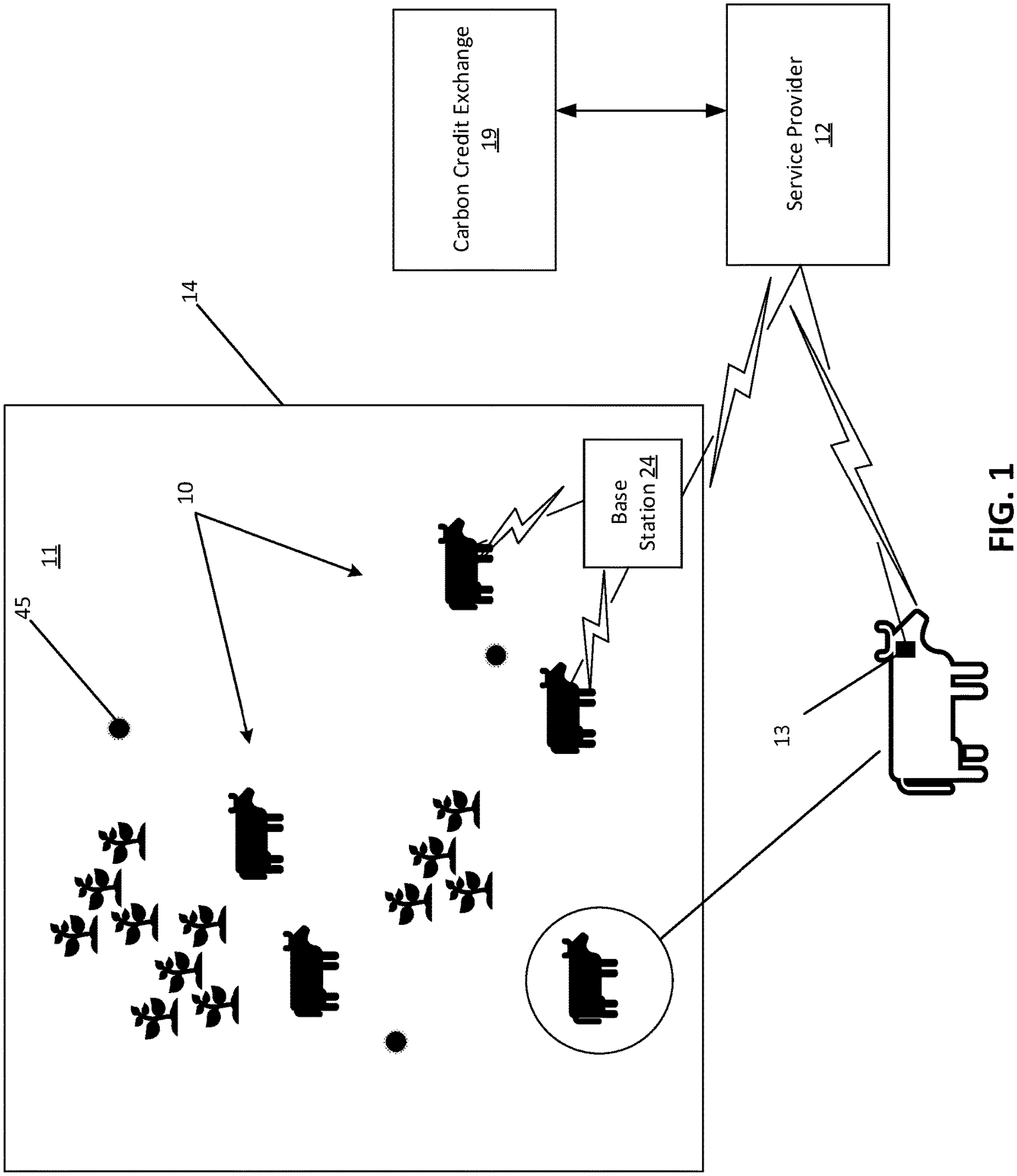
FIG. 1 is a perspective view of an environment in accordance with an example embodiment.

U.S. Patent No. US-2022-0192152-A1, the entire disclosure of which, except for any definitions, disclaimers, disavowals, and inconsistencies, is incorporated herein by reference.

A. Overview

The present disclosure is directed to systems and methods that alter the way ranchers manage their land and livestock, while also providing a unique opportunity for carbon credit generation. Users can create virtual geofences around their pastures or paddocks based on the parcel boundaries of the land they own or lease and upon which they will graze animals. This system provides a comprehensive and easy way for ranchers to monitor their livestock's grazing patterns and calculate carbon sequestration. It will be understood that while some examples provided herein may reference specific types of animals, such as cattle, the present disclosure is not so limited and can be applied to any type of livestock.

Livestock monitoring devices, which include at least location sensors and IMUs (Inertial Measurement Unit), are attached to the livestock that graze the pastures. These devices collect location data that can be used to estimate grazing activity data, which an example system uses to automatically generate inventory numbers for the animals in each paddock. By considering the location data, timestamps, and additional livestock information like age, weight, breed, and sex, the platform can accurately predict vegetation consumption by the animals.

The platform combines location and inertial measurement unit (IMU) data to estimate grazed areas and vegetation decrease. This information, paired with historical locations and movement data, can be used to generate a heat map that visualizes grazing activities. Satellite imagery can be overlaid on these maps to further indicate vegetation indexes and monitor the areas that have been grazed, as well as track changes in vegetation and forage amounts over the grazing season.

By determining factors such as the length of the grazing season, the type of vegetation, and the amount of carbon sequestered, ranchers can calculate the number of carbon credits generated by their livestock. An example system enables ranchers to sell these carbon credits on the platform or other external platforms such as a carbon credit exchange, providing an additional revenue stream while contributing to environmental sustainability.

Buyers, including corporations and individuals, can place bids and purchase these carbon credits through the platform at a listed market price or bid. This allows companies to shift from a carbon-negative to a carbon-neutral rating in the public eye, subsequently increasing their stock price value. In summary, the present technology provides a comprehensive solution for ranchers to manage their land, monitor livestock, and generate carbon credits while promoting sustainability and environmental responsibility.

The systems and methods can be configured to guide ranchers through a twice-over rotational grazing plan, verifying that the proper practices are being followed with hardware, such as the livestock monitoring devices and carbon ground sensors. This plan is applicable to most of the Midwest and Western portions of the United States. Grazing dates may vary depending on the region and location in the world, but the optimal grazing periods for carbon sequestration are June 1st through July 15th for the first rotation and July 16th through October 14th for the second rotation in this area. More carbon is sequestered in cold climates, as hot temperatures reduce the amount of carbon that can be sequestered. North Dakota, for example, is an example of a cold climate area that is suitable or ideal for carbon sequestration by following these rotation dates.

The twice-over rotational grazing plan provided by the systems and methods guides ranchers through the process of implementing and verifying these practices using a combination of software and hardware, such as livestock monitoring devices and carbon ground sensors. An example plan involves two rotations: the first between June 1st and July 15th and the second between July 16th and October 14$^{th}$ (other dates can be used depending on the livestock and area). Grazing dates may vary depending on the region and location in the world. This approach is especially suitable for cold climates, such as North Dakota, where more carbon is sequestered.

In one example, during the first three years of rotational grazing on native prairie grass, the soil must accumulate a significant amount of mineral nitrogen to achieve measurable carbon increase results. Implementing this grazing practice for three years produces around 0.5 tons of carbon per acre, which is similar to the amount generated by once-over or season-long grazing practices on native grass. After three years of rotational grazing, the soil reaches a threshold of 100 pounds of mineral nitrogen per acre per year in a 24-inch depth soil sample, which builds up the carbon base.

The livestock monitoring devices can be attached to mother cows, heifers, steers, and bulls (but can be applied to any animal such as goats, sheep, bison, etc.) on the pasture to capture their eating habits and verify the recommended rotational grazing practices. These livestock monitoring devices can be used for calves who may wear livestock monitoring devices for verification purposes. The platform also integrates with ground sensors and other devices to measure carbon sequestration, helping ranchers accurately monitor their progress.

The systems and methods provide various methods to measure soil carbon content, including gas chromatograms, soil carbon analyzers, walk-over surveys, soil sampling, infrared spectroscopy, and remote sensing. Data from these measurements can be collected from multiple soil samples in different zones of the pasture, depending on factors such as soil types and environmental conditions.

The systems and methods can be used to assist in verifying the age and weight of livestock, which impacts their daily consumption and the rate at which they deplete vegetative cover. Age can be determined through data from the livestock monitoring devices, user input, third-party verification, or image analysis, while weight can be measured using a scale linked to the livestock management system.

The systems and methods can also facilitate livestock rotation by controlling water 2 tank valves and gates, autonomously moving livestock to new pastures in search of water. This automation simplifies the process for ranchers, ensuring that their livestock follow the twice-over grazing plan effectively. In one embodiment, a paddock gate could be placed between paddocks. The paddock gate could be equipped with a speaker or horn that outputs an audible sound. The livestock are directed by these sounds to move from one paddock to the next. Similar audible sounds could be used to prompt the livestock when water sources are filling.

The systems and methods promote ecological management by guiding ranchers in matching the timing of grass defoliation to the appropriate growth stage, which triggers the desired outcome of increased carbon sequestration. This approach supports healthier grasslands, better soil health, and improved wildlife habitat, all while allowing ranchers to manage their livestock more efficiently and generate valuable carbon credits.

B. Exemplary Telecommunications Networks

Some of the embodiments of the present disclosure may be utilized upon any telecommunications network capable of transmitting data including voice data and other types of electronic data. Examples of suitable telecommunications networks for some of the embodiments of the present disclosure include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). Some of the example embodiments of the present disclosure may communicate via a single telecommunications network or multiple telecommunications networks concurrently. Various protocols may be utilized by the electronic devices for communications such as but not limited to HTTP, SMTP, FTP and WAP (wireless Application Protocol). Some of the embodiments of the present disclosure may be implemented upon various wireless networks such as but not limited to 3G, 4G, 5G, LTE, CDPD, CDMA, GSM, PDC, PHS, TDMA, FLEX, REFLEX, IDEN, TETRA, DECT, DATATAC, and MOBITEX. Some of the various example embodiments of the present disclosure may also be utilized with online services and internet service providers.

The Internet is an exemplary telecommunications network for the embodiments of the present disclosure. The Internet is comprised of a global computer network having a plurality of computer systems around the world that are in communication with one another. Via the Internet, the computer systems are able to transmit various types of data between one another. The communications between the computer systems may be accomplished via various methods such as but not limited to wireless, Ethernet, cable, direct connection, telephone lines, and satellite.

C. Central Communication Unit

The central communication unit may be comprised of any central communication site where communications are preferably established with. The central communication units may be comprised of a server computer, cloud-based computer, virtual computer, home computer or other computer system capable of receiving and transmitting data via IP networks and the telecommunication networks. As can be appreciated, a modem or other communication device may be required between each of the central communication units and the corresponding telecommunication networks. The central communication unit May be comprised of any electronic system capable of receiving and transmitting information (e.g. voice data, computer data, etc.).

D. Mobile Device

The mobile device may be comprised of any type of computer for practicing the various aspects of the embodiments of the present disclosure. For example, the mobile device can be a personal computer (e.g. APPLE® based computer, an IBM based computer, or compatible thereof) or tablet computer (e.g. IPAD®). The mobile device may also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

The mobile device may be comprised of any conventional computer. A conventional computer preferably includes a display screen (or monitor), a printer, a hard disk drive, a network interface, and a keyboard. A conventional computer also includes a microprocessor, a memory bus, random access memory (RAM), read only memory (ROM), a peripheral bus, and a keyboard controller. The microprocessor is a general-purpose digital processor that controls the operation of the computer. The microprocessor can be a single-chip processor or implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data. A peripheral bus is used to access the input, output and storage devices used by the computer. In the described embodiments, these devices include a display screen, a printer device, a hard disk drive, and a network interface. A keyboard controller is used to receive input from the keyboard and send decoded symbols for each pressed key to microprocessor over bus. The keyboard is used by a user to input commands and other instructions to the computer system. Other types of user input devices can also be used in conjunction with the embodiments of the present disclosure. For example, pointing devices such as a computer mouse, a track ball, a stylus, or a tablet to manipulate a pointer on a screen of the computer system. The display screen is an output device that displays images of data provided by the microprocessor via the peripheral bus or provided by other components in the computer. The printer device when operating as a printer provides an image on a sheet of paper or a similar surface. The hard disk drive can be utilized to store various types of data. The microprocessor, together with an operating system, operates to execute computer code and produce and use data. The computer code and data may reside on RAM, ROM, or hard disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

E. Example Embodiments

FIG. 1 is an overview of an example environment that includes livestock 10 in a paddock 11 or a series of paddocks, although any other area that can be defined in terms of specific boundaries can be used. An example area can include a pasture and the area can either be owned or leased by a rancher or other similar user. The livestock can graze in areas of the paddock(s) and these are referred to as grazing areas.

The environment also includes a service provider 12 and each of the livestock 10 is associated with a livestock monitoring device 13. The service provider 12 can receive output from the livestock monitoring device through any wireless network. Data that is received from the livestock monitoring devices can be used for any number use cases such as carbon credit assessments, rotational grazing, and the like, which will be described in greater detail herein.

In some embodiments, the paddock 11 is defined by a geofence 14 that is defined by a user, such as a rancher. Very broadly, the service provider 12 can enable ranchers to place calculated carbon credits on a carbon credit exchange (e.g., enable buyers to place bids and purchase carbon credits through the carbon credit exchange at a listed market price or bid). The service provider 12 may interface with a carbon credit exchange where a rancher can place available carbon credits for sale. The service provider 12 can host the carbon credit exchange in some embodiments. The service provider 12 can expose an application programming interface or other interface to the external environment.

Figure 2:
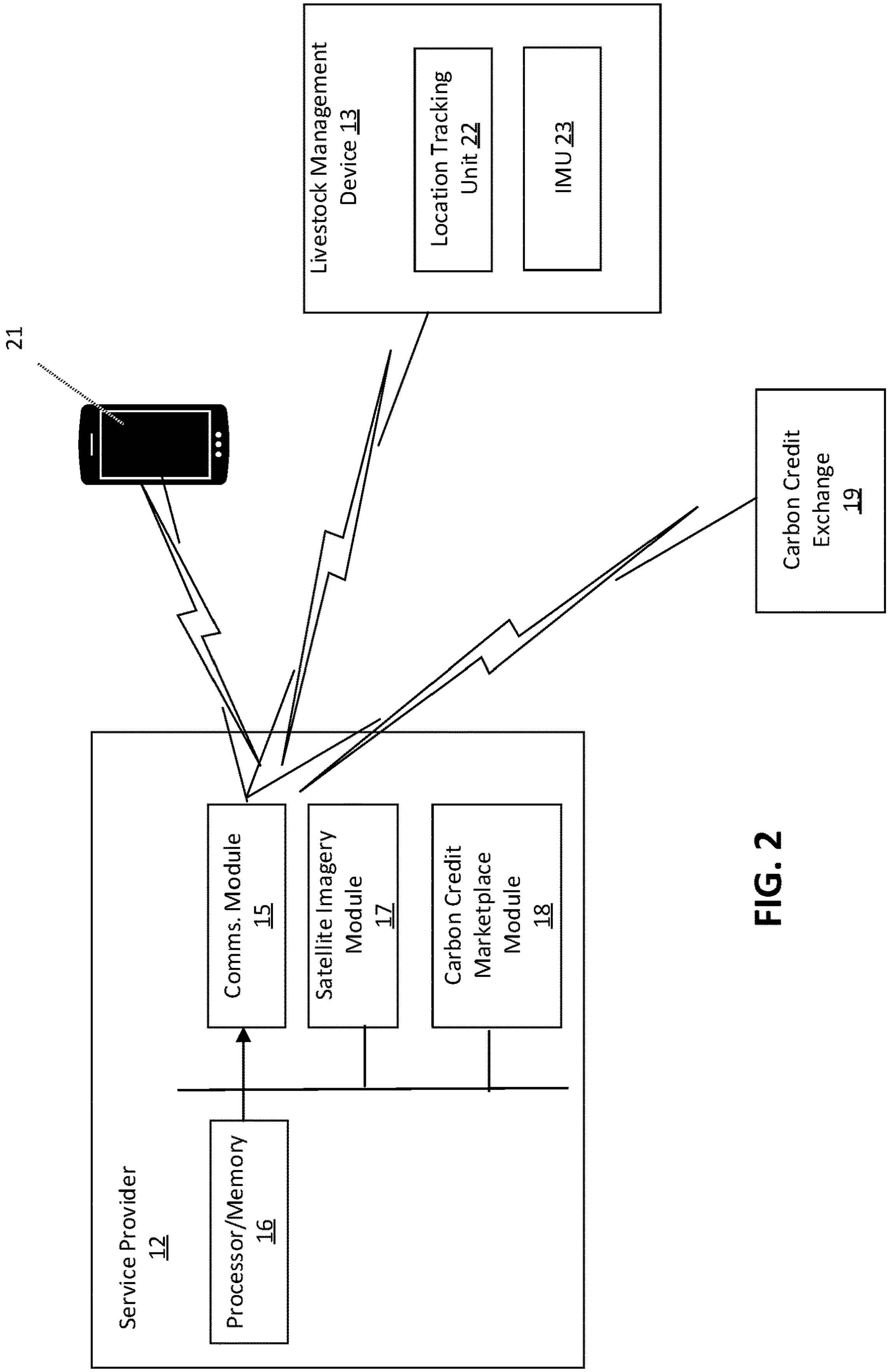
FIG. 2 is a schematic view of the service provider and various components of a carbon credit monitoring system.

FIG. 2 schematically illustrates the service provider 12 as having a communications module 15, a processor and memory 16, a satellite imagery module 17, and a carbon credit marketplace module 18. The service provider 12 is communicatively coupled with a carbon credit exchange 19 over a network, which can include any wired and/or wireless communication system. Users, such as ranchers, can access applications hosted on the service provider 12 with a user device 21, which can include a mobile device, laptop, server, or the like. As noted above, the service provider 12 receives data from the livestock monitoring device 13, which can include a location tracking unit 22 and an inertial measurement unit (IMU) 23. In general, the livestock monitoring device 13 outputs data such as location data, IMU data, and timestamps that are indicative of when the livestock 10 entered and left the paddock 11.

Referring now to FIGS. 1 and 2, initially, the service provider 12 is configured to establish boundaries around the parcel of land they own or lease and where their livestock will graze. The geofence 14 that is created will allow the service provider 12 to automatically generate the number of acres of land (and can be converted into other measurements). This data can be inputted by the user by Cartesian coordinates, GPS coordinates, parcel information, or any other boundary definition.

Inventory numbers of animals outfitted with a livestock monitoring device 13 in each paddock are automatically generated by the service provider 12 based on the received location data. This data is unique to the animal and can be date and time stamped as the animal enters and leaves the paddock 11. This can be paired with other data of the animal such as age, weight, breed, and sex as a predictor metric of how much vegetation they typically consume. In some embodiments, a subset of the animals is outfitted with a livestock monitoring device 13. Inferences or estimates of herd behavior, such as grazing or drinking can be made by monitoring this subset. A total number of animals and their characteristics (age, weight, etc.) are input into the service provider 12 which use the same metrics/averages from the outfitted animals to derive a grazing estimation and carbon credit calculation for the herd.

The service provider 12 can use the location data and IMU data that is obtained while the animal is eating to determine areas that are being grazed by the livestock, and where vegetation has decreased. Again, these grazing areas are inside the paddock 11 or a series of paddocks. A combination of historical locations and movement data and the animals eating activity can be used by the service provider 12 to generate a "heat map" of where the livestock have grazed. These areas that have been grazed can be marked by the service provider 12 by determining how much time was spent grazing at each location, and acre/area amounts of grazed land will be calculated by the service provider 12. Again, this data can be calculated using the location and IMU information obtained from the livestock monitoring devices.

To be sure, the age and weight verification of livestock can be used by the service provider 12 to determine how much an animal eats daily and how fast the animal depletes the vegetative cover of the grass. Age can be determined by the IMU movement data, or possibly heart rate or blood oxidation levels, from the livestock monitoring device 13. Other ways to verify include user inputted birth date and verification from livestock monitoring device 13 activity level, third party, or picture. An animal's weight is determined by a scale that is linked to the service provider 12 and associated with an individual tagged animal. Weight can be transmitted from a scale via Bluetooth to the livestock monitoring device 13 and then the livestock monitoring device 13 transmits the data to the service provider 12. In some instances, when the livestock are set to move to a new pasture a gate can be automatically opened (and in some instances, an audible sound can be emitted as noted above) by the service provider 12, and when all or a threshold of animals get into the new pasture the gate will be automatically closed. These options are used in instances where twice-over grazing is being implemented, as will be discussed herein.

In addition to the output of the livestock monitoring devices, the service provider 12, using the satellite imagery module 17, can optionally use satellite imagery and overlay the satellite imagery onto satellite imagery maps to indicate vegetation indexes, determine which areas have been grazed, and how significantly the forage (e.g., vegetation) has been decreased. The service provider 12 can monitor the paddock(s) over a grazing season as well to see that vegetation and forage amounts have increased.

In some embodiments, the service provider can infer a length of the grazing season, for example, by how long animals spend in certain paddocks, (i.e., rotational, season long), and what type of vegetation is present. In some instances, the type of vegetation can influence the amount of carbon sequestered. The service provider can determine how much land was grazed by how many animals during certain time periods of the year to determine a carbon credit calculation based on how much carbon was sequestered on their premises by their livestock. The ranchers will then be able to sell these credits that they have created through the carbon credit exchange 19, which is a third-party exchange. Buyers (corporations or individuals) will be able to place bids and buy these carbon credits at a listed market price or bid. In some instances, the carbon credit exchange can be hosted and controlled by the service provider 12.

In some embodiments, carbon calculations obtained by the service provider 12 can be enhanced using ground sensors or other implements. For example, ground sensors and other sensors that could be used to measure carbon. Livestock 10 equipped with the livestock monitoring device 13 could walk by a gas sensor 45 cand pick up a gas measurement via a short-range communication. The livestock monitoring device 13 could transmit them to the service provider 12. Also, users with mobile devices could pick up the readings, or a base station 24 could receive and transmit the readings if the base station 24 is in communication distance to both the gas sensor 45 and the service provider 12. In some embodiments, ground sensors can report the data back themselves through satellite/cellular communication.

In some embodiments, these ground sensors can be deployed across the paddock 11, dividing the paddock into zones to obtain soil samples in different zones. The service provider 12 can obtain these sensor readings to measure the carbon, even in large pastures covering thousands of acres. The number of ground sensors used may be dependent on soil types and other environmental factors though.

Other ways that can be used to measure carbon include, but are not limited to, using a gas chromatogram that measures carbon dioxide fluctuations at surface level. Another example includes a soil carbon analyzer or soil carbon meter. These devices inserted into soil at a certain depth and an electrical current is applied to the soil. The electrical resistance or conductivity is measured and used to calculate the soil carbon content. Some soil carbon analyzers are handheld and automated systems and they use near-infrared technology to measure carbon soil.

Another example method includes walk-over surveys where the soil is visually assessed for its color and texture, which can indicate the presence of organic matter and soil carbon. However, this method is subjective and may not provide accurate measurements. In another example, pictures be obtained and uploaded/analyzed by the service provider 12.

In some instances, soil sampling can be used, which involves collecting soil samples from different depths and analyzing them for carbon content in a laboratory. The most common laboratory methods for measuring soil carbon are dry combustion, wet oxidation, and loss on ignition. These methods involve burning or oxidizing the organic matter in the soil sample and measuring the amount of carbon dioxide released.

Yet another example includes using Infrared spectroscopy which employs an infrared beam to detect the carbon content in soil samples. It is a quick and non-destructive method that can be used in the field. It involves passing infrared light through a soil sample and measuring the absorption of the light by organic carbon molecules.

Another example includes remote sensing using satellite or aerial imagery to measure soil carbon content. The service provider 12 may use these data to verify the vegetative cover on the ground (verify it truly is native grass these grazing practices are being implemented on). The service provider 12 can determine vegetative cover, soil composition, and stocking rate data from government agencies and/or other external data repositories or information sources. A database can also be used that provides initial soil conditions and verify improvement later.

Figure 3:
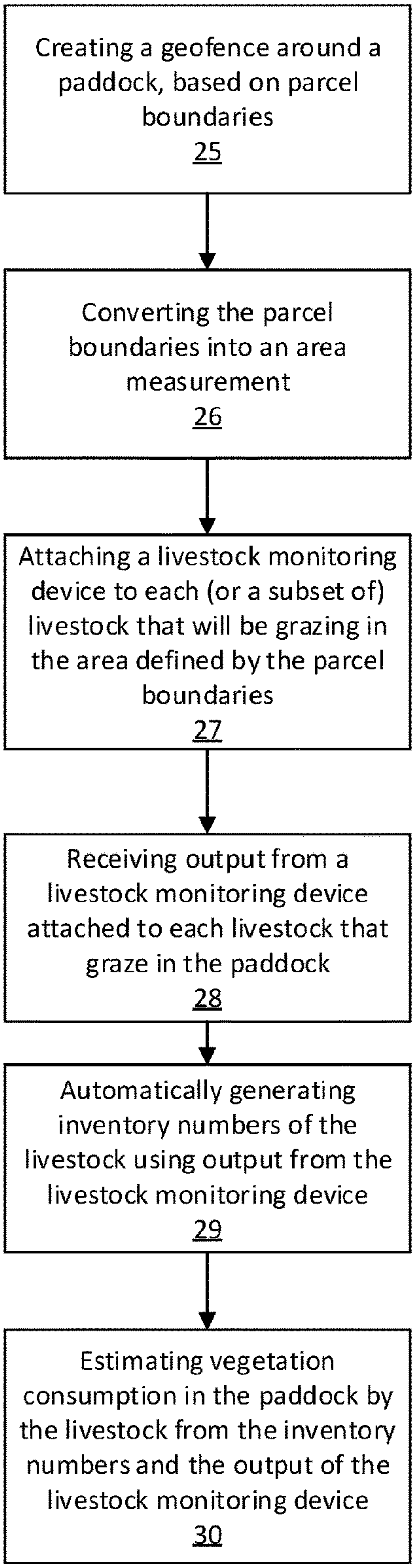
FIG. 3 is a flowchart of an example method of the present disclosure.

FIG. 3 illustrates an example method of the present disclosure. The method can include a step 25 of creating a geofence around a paddock, based on parcel boundaries. For example, a rancher can access an application provided by the service provider 12 and use an graphical user interface to enter parcel boundaries. These parcel boundaries can be in any form that designates the physical space. Once the physical space has been defined, the method can include a step 26 of converting the parcel boundaries into an area measurement.

The method may then include a step 27 of attaching a livestock monitoring device to each livestock that will be grazing in the area defined by the parcel boundaries (could include only tagging a portion of the livestock and inferring information about the entirety of the herd from the data gathered from the portion). The livestock monitoring device is capable of location sensing and also includes an IMU. To be sure, other sensors can be added to the livestock monitoring device as well. The livestock are then allowed to graze in the paddock. Sometimes the grazing occurs for a grazing season.

In one example, the livestock monitoring device can be applied to mother cows, heifers, steers, and bulls in the paddock and can capture where the cattle are eating with IMU data, and verify that the cattle are moved to new pastures in these suggested timeframes. The livestock monitoring device can be utilized by all the calves.

The method may include a step 28 of receiving output from a livestock monitoring device attached to each livestock that graze in the paddock. In some instances, the livestock monitoring device comprises a location tracking unit and an inertial measurement unit (IMU), as noted above. The method can also include a step 29 of automatically generating inventory numbers of the livestock using output from the livestock monitoring device. To be sure, the output includes location data and timestamps that are indicative of when the livestock entered and left the paddock. As mentioned herein, each livestock monitoring device can output a unique code that is indicative of a particular animal. The service provider can then link the data from a particular livestock monitoring device to a particular animal.

Using the received data, the method can include a step 30 of estimating vegetation consumption in the paddock by the livestock from the inventory numbers and the output of the livestock monitoring device. These data can also be used to track how well the livestock are grazing, in addition to using the data to determine carbon credits or other usages. In some instances, this can include combining the inventory numbers with additional livestock data as a predictor metric of vegetation consumption. Other attributes may include, but are not limited to, age, sex, weight, breed and so forth. Each of these parameters may affect the estimation of how much vegetation is being consumed by a particular animal.

Figure 4:
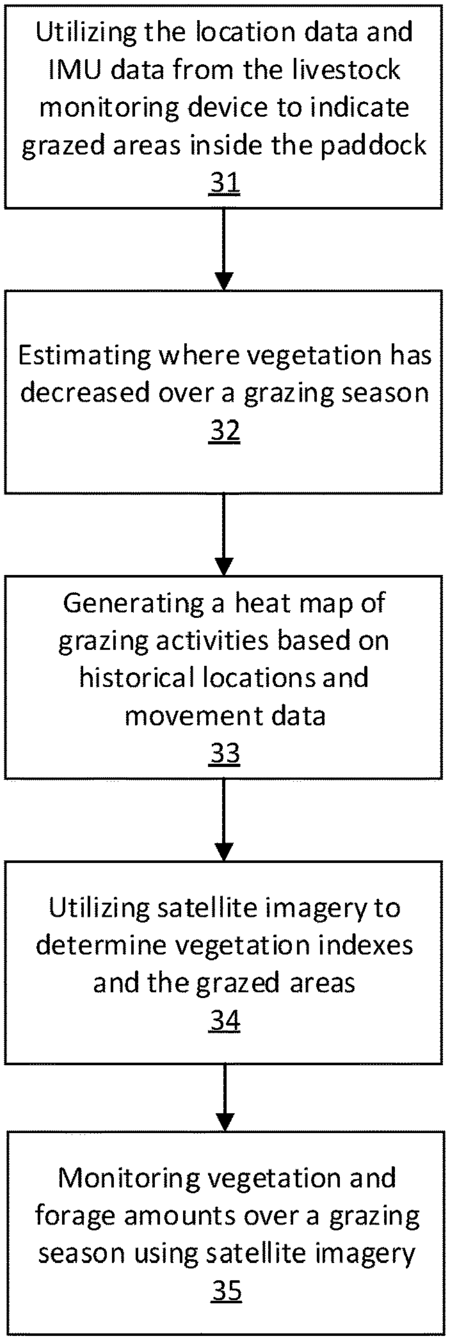
FIG. 4 is a flowchart of another example method of the present disclosure.

FIG. 4 is another method of the present disclosure. The method may include a step of utilizing the location data and IMU data from the livestock monitoring device to indicate grazed areas inside the paddock. The method can also include a step 32 of estimating where vegetation has decreased over a grazing season. This estimation is possible do to the fact that the location data and IMU data are granular enough to enable the service provider to determine areas inside the paddock that are being grazed. Again, the area defined by the parcel boundaries may be hundreds or thousands of acres in some instances.

The method may also include a step 33 of generating a heat map of grazing activities based on historical locations and movement data. Again, this is made possible through the collection of location data and IMU data. In an optional step 34, the method may include utilizing satellite imagery to determine vegetation indexes and the grazed areas, as well as a step 35 of monitoring vegetation and forage amounts over a grazing season using satellite imagery. This could include overlaying satellite images obtained of the parcel of land before and after a grazing season to infer vegetation and forage amounts.

With respect to vegetation indexes, these are usually obtained by linear or nonlinear combination operations on remotely sensed red and near-infrared (NIR) reflectance data, which are simple and effective parameters for characterizing vegetation cover and growth status (of plants/grasses). Normalized Difference Vegetation Index (NDVI) Satellite imagery is a commonly used satellite imagery tool. NDVI assists in forecasting fire zones, extracting vegetation health information, and assessment of moisture conditions, and so forth.

Figure 5:
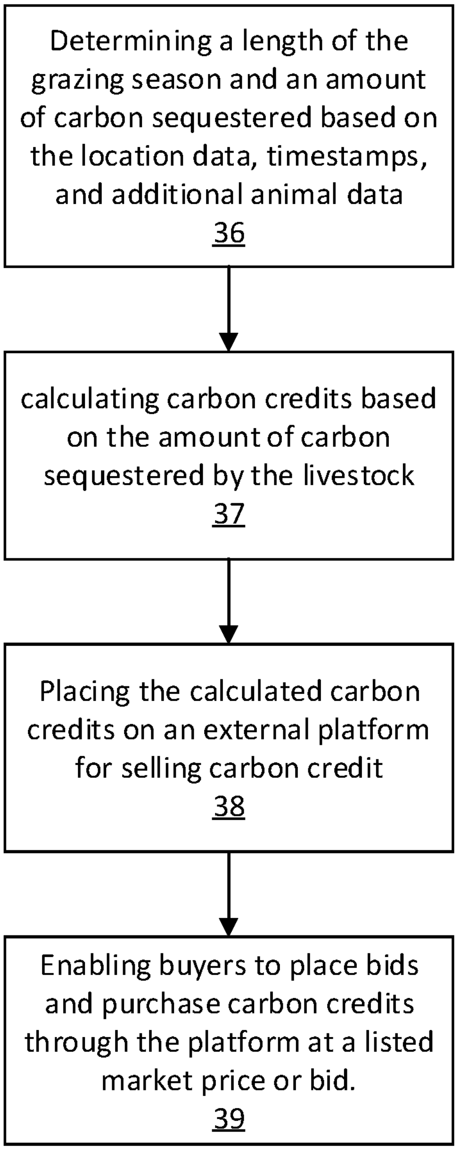
FIG. 5 is a flowchart of yet another example method of the present disclosure.

FIG. 5 is a flowchart of a method for calculating and selling carbon credits. The method may include a step 36 of determining a length of the grazing season and an amount of carbon sequestered based on the location data, timestamps, and additional animal data. As noted above, the additional animal data could include any parameters, biometric or otherwise that are descriptive of a particular animal.

The method can include a step 37 of calculating carbon credits based on the amount of carbon sequestered. After the carbon credits have been calculated, the method includes a step 38 of placing the calculated carbon credits on an external platform for selling carbon credits. Again, this platform need not be external but could be controlled by the service provider. In some instances, the method includes a step 39 of enabling buyers to place bids and purchase carbon credits through the platform at a listed market price or bid.

Figure 6:
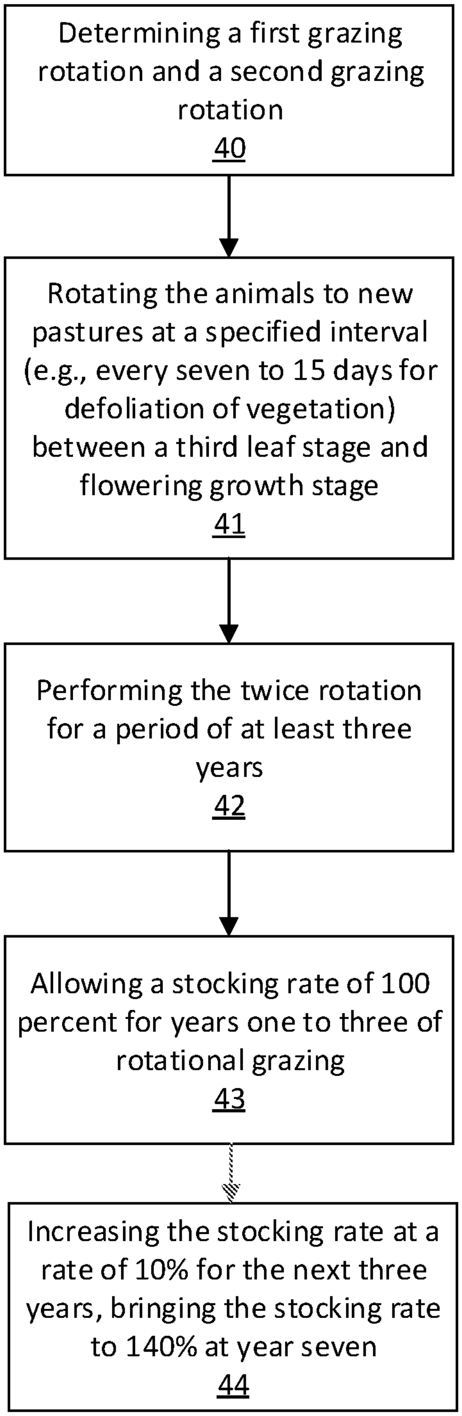
FIG. 6 is a flowchart of an example method for grazing rotation.

FIG. 6 is a flowchart of an example method for twice over grazing that can be implemented through an application at the service provider level, as an example. For reference, some example grazing periods will be discussed. These time periods are not limiting in any way. By example, a twice overgrazing method can occur over a time period from June $1^{st}$-July $15^{th}$ for a first rotation and from July $16^{th}$-October $14^{th}$ for a second rotation. Thus, the method includes a step 40 of determining a first grazing rotation and a second grazing rotation. The rotations are determined geographically in certain areas. For example, these time frames apply to areas from Mississippi to the Pacific Ocean and from Nebraska to Manitoba. These dates are based on an amount of sunlight per day. To be sure, optimal grazing dates may vary depending on region and location in the world.

For context, more carbon is sequestered in cold climates and hot temperatures sequester less carbon. The method could include a step 41 of rotating the animals to new pastures at a specified interval (e.g., every seven to 15 days for defoliation of vegetation) between a third leaf stage and flowering growth stage. Again, this is merely an example. To be sure, rotational grazing practices may need to be practiced for three years before significant amounts of carbon can be sequestered. The first three years of rotational grazing on native grass produce around 0.5 tons of carbon per acre. Once over and season long grazing practices on native grass produce around 0.5 tons of carbon per acre as well. Thus, the method includes a step 42 of performing the twice rotation for a period of at least three years.

One particular overgrazing process involves native grass, which is a perennial. Once tillage from a steam engine is performed on soil the perennial root is removed and the soil can only support annual crops, native grass can never be restored and grown on that ground again. So many organisms and nutrients are in the soil that grow and live off of each other, that the composition might not be restored to support perennial native grass again.

After three years of rotational grazing the soil reaches the threshold of 100 lbs of mineral Nitrogen per acre per year in a 24-inch depth soil sample, which is what builds up the carbon base. Approximately 950 lbs of soil organisms per acre achieves 100 lbs of mineral Nitrogen. Soil organisms can be built up to go from organic Nitrogen to mineral Nitrogen.

To sequester carbon, carbon can enter into the aggregates of the soil. The method can include a step 43 of allowing a stocking rate of 100 percent for years one to three of rotational grazing. The method includes a step 44 of increasing the stocking rate at a rate of 10% for the next three years, bringing the stocking rate to 140% at year seven. To be sure, by year four of rotational grazing on native grass, approximately 1.5-2.2 tons of carbon per acre are sequestered by the ground.

It will be understood that May, June, and July are peak carbon months, and there is a downward trend in August, September, and October making a bell-shaped curve. Nitrogen is typically highest in the month of May. It will be understood that to measure mineral Nitrogen, measurements of Nitrate and Ammonium can be obtained and then added together. Silt has the most carbon, but it should be in aggregated soil. Adding fertilizer can kill native grass as it speeds up the compounds and makes the soil carbon look high at first, but causes damage over time. In one embodiment, fertilizer use and its effects can be determined from ground sensors and satellite imagery as well. If ranchers use fertilizer, we would penalize them or reduce their carbon credits. With respect to taking soil samples, one example process includes obtaining four or more data points per soil sample in a tube that is precisely one inch in diameter with the following dimensions 0-3 inches, 3-6 inches, 6-12 inches, 12-inches.

To enable the rancher to use and track this grazing rotation process, the service provider can generate any number of graphical user interfaces that allow the user to input specifics of their grazing as well as gathering the input from the livestock monitoring devices. The service provider can transmit messages to a computing device of the rancher that reminds the rancher to move livestock from area to area over a period of years to create carbon credits. The service provider can provide mechanisms for tracking and calculating the carbon credits and place the same for sale on an exchange.

F. Example Use Case

A rancher has 140 cows, 10 bulls, and 150 calves which are each outfitted with livestock management devices. The rancher has 5,000 acres of land in Western ND planted into native prairie grass. The rancher rotationally grazes the cattle across five paddocks and grazed all five paddocks between June 1st and July 15th of the year, and then grazed them for a second time between July 16th and October 14th. The rancher qualifies for the rotational grazing carbon capture amount of 0.5 t (tons) per acre for the first three years of the practice and 1.5-2.2 t per acre every year after by continuing the practice. The eating location data and eating patterns of his cattle determine that only 2,000 acres were actually grazed where the native prairie grass was eaten. Again, this can be determined from output of the livestock monitoring devices and/or use of satellite imagery. In this instance, in the first year the rancher would be paid on 2,000 acres×0.5 t of carbon (per acre) which equates to an 1,000 t carbon credit. The rancher then uses the service provider to list the 1,000 t of carbon that has been verified by the service provider for a going rate of $80/t. A buyer buys all or part of the carbon credits for $80,000, so that they can shift from a carbon-negative to a carbon-neutral rating in the public eye, which in turn increases their stock price's value.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, the computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the present disclosure will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the embodiments in the present disclosure, suitable methods and materials are described above. Thus, the present disclosure is not intended to be limited to the embodiments shown, but is to be accorded the widest scope consistent with the principles and features disclosed herein.

While various embodiments have been described above, it should be understood that they have been presented by way of example only, and not limitation. The descriptions are not intended to limit the scope of the technology to the particular forms set forth herein. To the contrary, the present descriptions are intended to cover such alternatives, modifications, and equivalents as may be included within the spirit and scope of the technology as defined by the appended claims and otherwise appreciated by one of ordinary skill in the art. The various embodiments of the present disclosure may be embodied in other specific forms without departing from the spirit or essential attributes thereof, and it is therefore desired that the various embodiments in the present disclosure be considered in all respects as illustrative and not restrictive. Thus, the breadth and scope of a preferred embodiment should not be limited by any of the above-described exemplary embodiments.

Unless otherwise defined, all technical and scientific terms used herein have the same meaning as commonly understood by one of ordinary skill in the art to which this invention belongs. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. Any headings utilized within the description are for convenience only and have no legal or limiting effect.

What is claimed is:

1. A system, comprising:

a livestock monitoring device, comprising a location tracking unit and an inertial measurement unit (IMU), that is attached to a livestock that grazes in a first paddock, wherein the location tracking unit produces location data representative of a location of the livestock and wherein the IMU produces IMU data that is representative of an eating activity performed by the livestock;

a service provider that receives the location data and the IMU data from the livestock monitoring device and wherein the service provider is configured to:

enable a user to create a geofence around the first paddock, based on parcel boundaries;

automatically generate inventory numbers of the livestock using the location data from the livestock monitoring device, the location data being indicative of when the livestock entered the first paddock;

produce an estimation of vegetation consumption in the first paddock by the livestock based on the inventory numbers, the location data, and the IMU data;

determine to move the livestock to a second paddock to increase carbon sequestration in the first paddock based on the estimation of vegetation consumption;

determine a measure of carbon sequestration in the first paddock, wherein a measure of carbon sequestration is representative of an amount of carbon in a soil of the first paddock; and determine that carbon sequestration in the first paddock has increased based on the measure of carbon sequestration, wherein an increase in the carbon sequestration verifies a rotation grazing schedule for moving the livestock between the first paddock and the second paddock based on the estimation of vegetation consumption.

2. The system of claim 1, wherein the service provider is configured to generate a heat map of grazing activities based on the location data and the IMU data.

3. The system of claim 2, wherein the service provider further comprises a satellite imagery module configured to obtain satellite imagery and use the satellite imagery to determine vegetation indexes and grazed areas.

4. The system of claim 3, wherein the satellite imagery module is configured to monitor vegetation and forage amounts over a grazing season.

5. The system of claim 4, wherein the service provider is configured to determine a length of the grazing season and a type of vegetation in the first paddock.

6. The system of claim 5, wherein the service provider is configured to calculate carbon credits based on the measure of carbon sequestered in the soil of the first paddock.

7. The system of claim 6, wherein the service provider further comprises a carbon credit marketplace module configured to enable ranchers to place the calculated carbon credits on a carbon credit exchange.

8. The system of claim 7, wherein the carbon credit marketplace module is configured to enable buyers to place bids and purchase carbon credits through the carbon credit exchange at a listed market price or bid.

9. The system of claim 1, wherein the measure of carbon sequestration is determined from one or more of: a carbon ground sensor, a gas chromatogram, a soil carbon analyzer, a walk-over survey, a soil sample, an infrared spectroscopy, and remote sensing.

10. A method, comprising:

creating a geofence around a first paddock, based on parcel boundaries;

receiving output from a livestock monitoring device attached to each livestock that graze in the first paddock, the livestock monitoring device comprising a location tracking unit that produces location data representative of a location of the livestock and an inertial measurement unit (IMU) that produces IMU data that is representative of an eating activity performed by the livestock;

automatically generating inventory numbers of the livestock or a portion of the livestock using the location data which is indicative of when the livestock entered the first paddock;

producing an estimation of vegetation consumption in the first paddock by the livestock based on the inventory numbers, the location data, and the IMU data;

determining to move the livestock to a second paddock to increase carbon sequestration in the first paddock based on the estimation of vegetation consumption;

determining a measure of carbon sequestration in the first paddock, wherein a measure of carbon sequestration is representative of an amount of carbon in a soil of the first paddock; and determining that carbon sequestration in the first paddock has increased based on the measure of carbon sequestration, wherein an increase in the carbon sequestration verifies a rotation grazing schedule for moving the livestock between the first paddock and the second paddock based on the estimation of vegetation consumption.

11. The method of claim 10, further comprising generating a heat map of grazing activities based on historical locations and movement data.

12. The method of claim 11, further comprising utilizing satellite imagery to determine vegetation indexes and the grazed areas.

13. The method of claim 12, further comprising monitoring vegetation and forage amounts over a grazing season using satellite imagery.

14. The method of claim 13, further comprising determining a length of the grazing season and a type of vegetation based on the location data and the IMU data.

15. The method of claim 14, further comprising calculating carbon credits based on the measure of carbon sequestered in the soil of the first paddock.

16. The method of claim 15, further comprising placing the calculated carbon credits on an external platform for selling carbon credits.

17. The method of claim 16, further comprising enabling buyers to place bids and purchase carbon credits through the platform at a listed market price or bid.

18. The method of claim 10, further comprising combining the inventory numbers with additional livestock data as a predictor metric of vegetation consumption.

19. The method of claim 10, wherein determining the measure of carbon sequestration is achieved through use of one or more of: a carbon ground sensor, a gas chromatogram, a soil carbon analyzer, a walk-over survey, a soil sample, an infrared spectroscopy, and remote sensing.

* * * * *